(12) United States Patent
Gaylord

(10) Patent No.: US 8,872,881 B2
(45) Date of Patent: *Oct. 28, 2014

(54) MINIMAL DECODING METHOD FOR SPATIALLY MULTIPLEXING DIGITAL VIDEO PICTURES

(75) Inventor: William J. Gaylord, Stone Mountain, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 115 days.

This patent is subject to a terminal disclaimer.

(21) Appl. No.: 13/453,055

(22) Filed: Apr. 23, 2012

(65) Prior Publication Data

US 2012/0262630 A1 Oct. 18, 2012

Related U.S. Application Data

(63) Continuation of application No. 12/423,649, filed on Apr. 14, 2009, now Pat. No. 8,179,420, which is a continuation of application No. 11/202,914, filed on Aug. 12, 2005, now Pat. No. 7,518,630, and a continuation of application No. 09/955,607, filed on Sep. 19, 2001, now Pat. No. 6,956,600.

(51) Int. Cl.
*H04N 19/00* (2014.01)
*H04N 7/15* (2006.01)
*H04N 19/174* (2014.01)
*H04N 19/70* (2014.01)

(52) U.S. Cl.
CPC ......... *H04N 19/00272* (2013.01); *H04N 19/00* (2013.01); *H04N 7/15* (2013.01); *H04N 7/152* (2013.01); *H04N 19/00884* (2013.01)
USPC ................... 348/14.08; 348/14.13; 348/14.09

(58) Field of Classification Search
USPC ............................ 348/14.01–14.16, 584, 588
See application file for complete search history.

(56) References Cited

U.S. PATENT DOCUMENTS 5,764,277 A 6/1998 Loui et al.
5,995,146 A * 11/1999 Rasmussen .............. 375/240.01
(Continued)

FOREIGN PATENT DOCUMENTS

EP 0987897 8/1999
JP 2001069474 3/2001
WO 9736425 10/1997

OTHER PUBLICATIONS

Loui et al. "Video Combining for Multipoint Videoconferencing", New Jersey, IS&T 48th Annual Conf Proceedings, Bell Communications Research, pp. 48-50 (1995).
(Continued)

*Primary Examiner* — Melur Ramakrishnaiah
(74) *Attorney, Agent, or Firm* — Gardner Groff Greenwald & Villanueva, P.C.

(57) ABSTRACT

A combined video image is created from a plurality of video images. Each video image has a plurality of video image components, and each video image component has an image component header. The image header is removed from each video image to be included in the combined video image, and a new image header is generated for the combined video image. The image component header of each video image component to be included in the combined video image is altered to set an image position for the video image component within the combined video image. The combined video image is generated by concatenating the new image header with the plurality of video images having no image headers and the video image components having the altered image component headers.

13 Claims, 8 Drawing Sheets

(56) References Cited

U.S. PATENT DOCUMENTS

| | | | |
|---|---|---|---|
| 6,049,531 A | 4/2000 | Roy | |
| 6,141,062 A | 10/2000 | Hall et al. | |
| 6,181,824 B1 | 1/2001 | Takizawa et al. | |
| 6,285,661 B1 * | 9/2001 | Zhu et al. | 370/260 |
| 6,441,841 B1 * | 8/2002 | Tanoi | 348/14.07 |
| 6,590,604 B1 | 7/2003 | Tucker et al. | |
| 6,606,112 B1 | 8/2003 | Falco | |
| 6,614,900 B1 * | 9/2003 | Champoux | 379/229 |
| 6,658,618 B1 | 12/2003 | Gu et al. | |
| 6,683,909 B1 | 1/2004 | Falco | |
| 6,775,241 B1 * | 8/2004 | Levin | 370/252 |
| 6,934,278 B1 * | 8/2005 | Champa et al. | 370/352 |

OTHER PUBLICATIONS

Huang et al. "Block Quantization of Correlated Gaussian Random Variables", IEEE Transactions on Comm Sys, CS-11(3):289-296 (1963).

Segall, A. "Bit Allocation and Encoding for Vector Sources", IEEE Transactions on Information Theory, IT-22 (2)162-169 (1976).

Ramstad, T.A. "Considerations on Quantization and Dynamic Bit-Allocated Subband Coders", ICASSP, Japan, pp. 841-844 (1986).

Woods et al. "Subband Coding of Images", IEEE Trans on Acoustics, Speech, Signal Processing, ASSP-34 (5):1278-1288 (1986).

Vaidyanthan, P.P. "Quadrature Mirror Filter Banks, M-Bank Extensions and Perfect-Reconstructions Techniques", IEEE ASSP Magazine, 4:4-20 (1987).

Gharavi, H. "Differential Sub-Band Coding of Video Signals", ICASSP, Scotland, pp. 1819-1822 (1989).

Smith et al. "Analysis/Synthesis Techniques for Subband Image Coding", IEEE Trans on Acoustics, Speech, Signal Processing, ASSP-38(8):1446-1456 (1990).

Tzou et al. "An Intelligent Rate Control for an Intrafield Subband HDTV Coder", Proc Intl Conf Symposium on Circuits and Electronics, 1:284-287 (1991).

Lau et al. "Receiver Buffer Control for Variable Bit-Rate Real-Time Video", Proc Intl Conf on Communications, 1:544-550 (1992).

Chen et al. "A Self-Governing Rate Buffer Control Strategy for Pseudoconstant Bit Rate Video Coding", IEEE Trans on Image Processing, 2(1):50-59 (1993).

Lei et al. "Video Bridging Based on H.261 Standard", IEEE Trans on Circuits and Systems for Video TEchnology, 4 (4):425-437 (1994).

Gaylord, W.J. "Coding for Multipoint Video Conferencing" BellSouth Telecommunications Presentation, EIA Digital Video Workshop (1992).

* cited by examiner

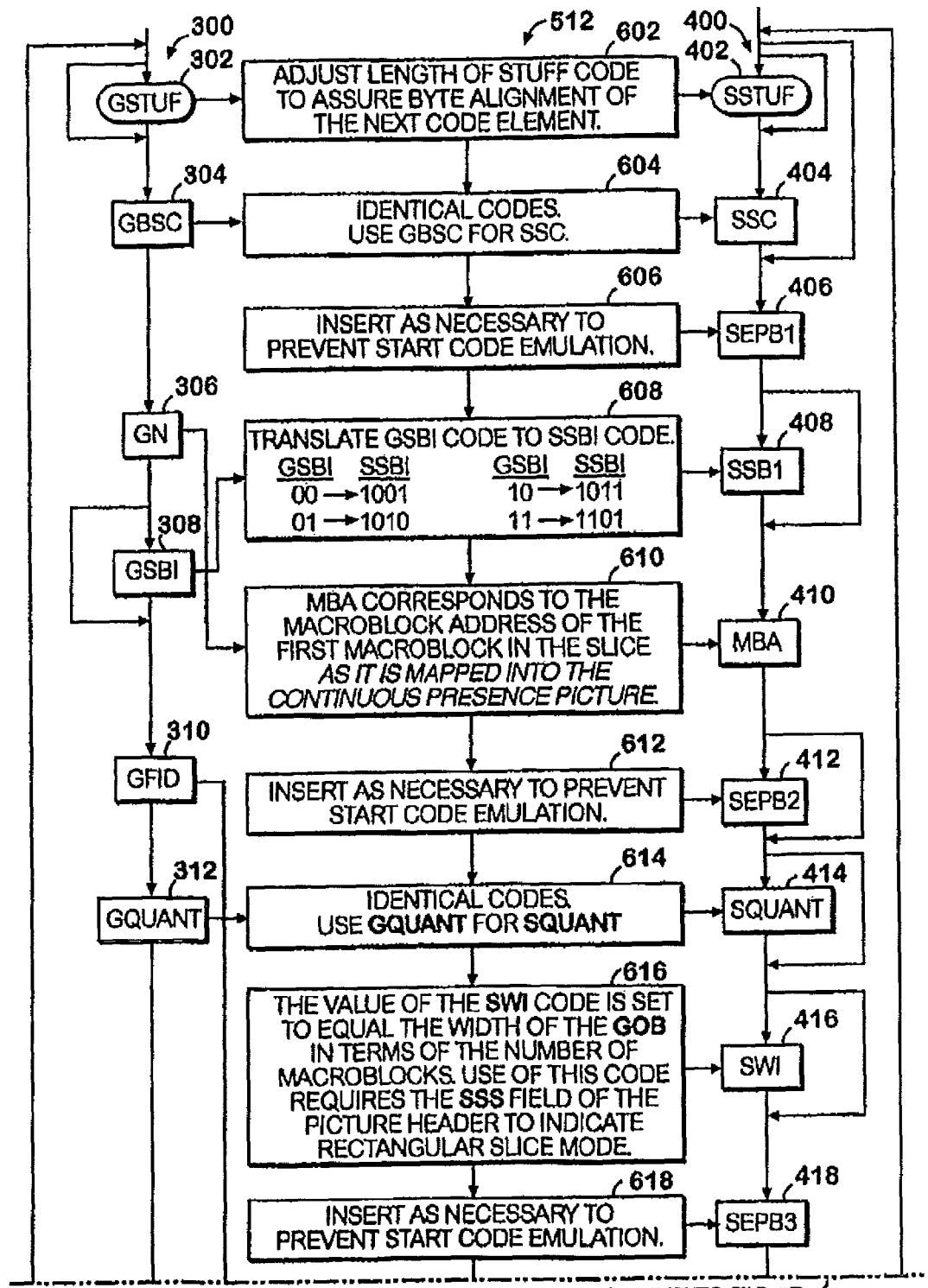
FIG.6A    MATCHLINE TO FIG.6B

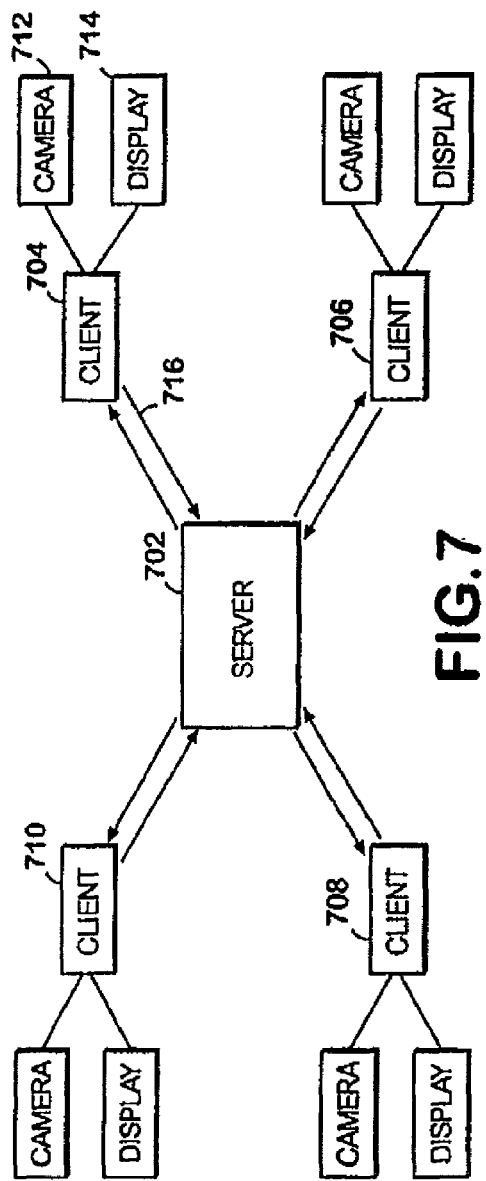
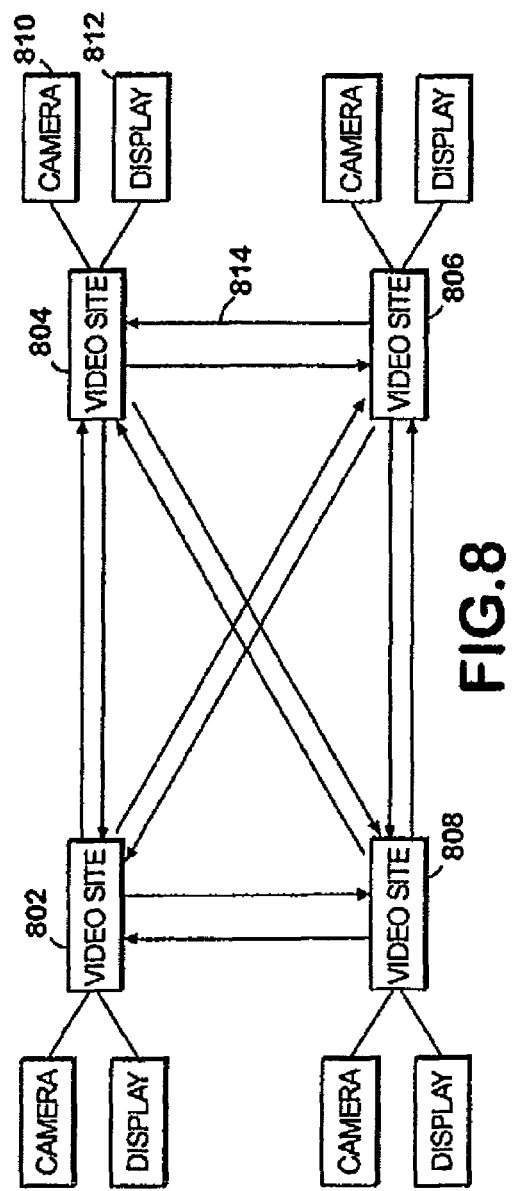

MINIMAL DECODING METHOD FOR SPATIALLY MULTIPLEXING DIGITAL VIDEO PICTURES

TECHNICAL FIELD

The present invention relates to combining multiple digital video picture frames into a single spatial multiplex video picture frame to produce a single displayed picture that is a composite of several individual pictures. More particularly, the present invention relates to generating the spatial multiplex video picture frame by altering header information of the individual video picture frames being combined.

BACKGROUND

A motion picture such as broadcast television is made of individual pictures that are rapidly displayed to give the illusion of continuous motion. Each individual picture in the sequence is a picture frame. A digitally encoded picture frame is made of many discrete picture elements, or pixels, that are arranged in a two-dimensional array. Each pixel represents the color (chrominance) and brightness (luminance) at its particular point in the picture. The pixels may be grouped for purposes of subsequent digital processing (such as digital compression). For example, the picture frame may be segmented into a rectangular array of contiguous macroblocks, as defined by the ITU-T H series coding structure. Each macroblock typically represents a 16×16 square of pixels.

Macroblocks may in turn be grouped into picture frame components such as slices or groups of blocks, as defined under the ITU-T H.263 video coding structure. Under H.263, a group of blocks is rectangular and always has the horizontal width of the picture, but the number of rows of group of blocks per frame depends on the number of lines in the picture. For example, one row of a group of blocks is used for pictures having 4 to 400 lines, two rows are used for pictures having 404 to 800 lines, and four rows are used for pictures having 804 to 1152 lines. A slice, on the other hand, is a flexible grouping of macroblocks that is not necessarily rectangular. Headers within the encoded video picture bit stream identify and provide important information about the various subcomponents that make up the encoded video picture. The picture frame itself has a header, which contains information about how the picture frame was processed. Each group of blocks or slice within a video picture frame has a header that defines the picture frame component as being a slice or group of blocks as well as providing information regarding the placement of the component within the picture frame. Each header is interpreted by a decoder when decoding the data making up the picture frame in preparation for displaying it.

In certain applications, displaying multiple picture frames within a single display is desirable. For example, in video-conferencing situations it is useful for each participant to have a video display showing each of the other participants at remote locations. Visual cues are generally an important part of a discussion among a group of participants, and it is beneficial for each participant's display to present the visual cues of all participants simultaneously. Any method of simultaneously displaying all the conference participants is called a continuous presence display. This can be accomplished by using multiple decoders and multiple video displays at each site, or by combining the individual video pictures into a single video picture in a mosaic arrangement of the several individual pictures (called a spatial multiplex).

Multiplexing picture frames into a single composite picture frame requires some form of processing of each picture frame's encoded data. Conventionally, a spatial multiplex video picture frame could be created by completely decoding each picture frame to be multiplexed to a baseband level, multiplexing at the baseband level, and then re-encoding for transmission to the various locations for display. However, decoding and re-encoding a complete picture frame is computationally intensive and generally consumes a significant amount of time.

The H.263 standard provides a continuous presence multipoint and video multiplex mode that allows up to four individual picture frames to be included in a single bitstream, but each picture frame must be individually decoded by individual decoders or by one very fast decoder. No means of simultaneously displaying the pictures is specified in the standard. Additionally, time-consuming processing must be applied to the picture frames after they have been individually decoded to multiplex them together into a composite image for display.

Therefore, there is a need in the art for a method and system that can spatially multiplex multiple picture frames into a single picture frame without requiring each individual picture frame to be fully decoded when being multiplexed and without requiring additional processing after decoding to multiplex the picture frames.

SUMMARY

The present invention spatially multiplexes several picture frames into a single spatial multiplex video picture frame by manipulating header information for the picture frame components, such as the groups of blocks or slices, containing the picture frame data. A picture header associated with each picture frame is removed and a new picture header is generated that applies to the spatial multiplex video picture frame that is a composite of all of the individual picture frames. The new header provides an indication of a slice format for the spatial multiplex video picture frame. The component headers of each picture frame are altered to set a slice format based picture position for the picture frame within the picture that results from the spatial multiplex video picture frame. The slice format is prevalent within the H.263 standard. Thus, only the component headers need to be decoded and re-encoded to establish the spatial multiplex video picture frame.

The spatial multiplex video picture frame results from concatenating the new picture header together with the picture frames having the altered component header information. The spatial multiplex video picture frame may then be decoded as if it were a single picture frame to display the composite of the several individual picture frames. Displaying the spatial multiplex video picture frame allows the individual picture frames to be viewed simultaneously on one display screen.

The system that multiplexes the individual picture frames may be a scalable facility such that as the need for picture frame multiplexing increases, the system may be expanded to fill the need. The system includes a plurality of computing devices, such as single board computers, linked to a data packet switch through a serial interface. Each computing device within the system has the ability to combine individual picture frames into a single spatial multiplex video picture frame by altering the headers of the picture frame components to set a slice format based picture position for the picture frames. As the need for additional processing arises, additional computing devices in communication with the data packet switch may be added to provide additional capacity.

The present invention may be employed in a networked environment where a processing device, such as a network server, communicates with several client devices, such as videoconferencing devices. The processing device receives the multiple picture frames from various communication channels in the network. For example, the processing device may receive a stream of video picture frames from each participant in a videoconference through the network. The processing device then multiplexes the individual picture frames into a spatial multiplex video picture frame by altering the component header information to produce a slice based picture position for each frame. The spatial multiplex video picture frame is transmitted back through the communication channels of the network where it can be displayed by the display screen of the client devices.

The present invention may also be employed in a networked environment where each video site, such as a videoconferencing device, generates video picture frames. The picture frames are transmitted to other video sites in the network, and picture frames produced by other video sites are received. The video site multiplexes the picture frames to produces the multiplexed composite picture frame by altering the component header information to set a slice format based picture position. The video site may then decode the spatial multiplex video picture frame and display it.

The various aspects of the present invention may be more clearly understood and appreciated from a review of the following detailed description of the disclosed embodiments and by reference to the drawings and claims.

DESCRIPTION OF THE DRAWINGS

FIG. 7. is a block diagram of an embodiment employing single-point processing in a network environment.

FIG. 8 is a block diagram of an embodiment employing on-site processing in a networked environment.

DETAILED DESCRIPTION

Figure 1:
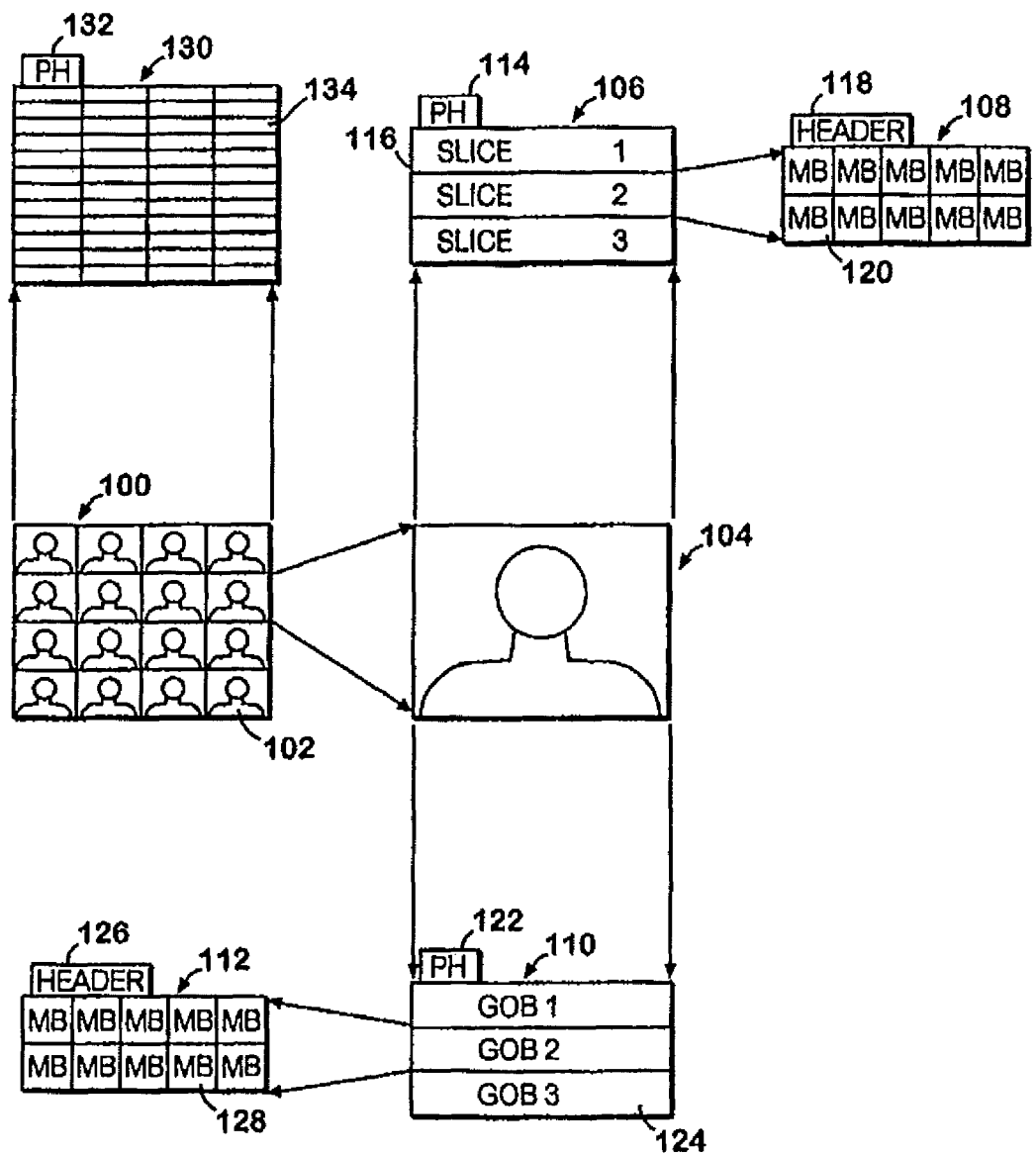
FIG. 1 illustrates a composite picture frame and slice structure, an individual picture frame that may be multiplexed into the composite picture frame, and alternative picture frame structures.

FIG. 1 illustrates a display of a spatial multiplex video picture frame 100 made up of individual picture frames 102. As shown, the spatial multiplex video picture frame 100 includes sixteen picture frames 102 of individual people participating in a videoconference where the picture frames 102 form a mosaic pattern. Because each participant is always in view, the spatial multiplex video picture frame 100 is referred to as a continuous presence display. As will be discussed below, each individual picture frame 102 of the spatial multiplex video picture frame 100 is initially a normal picture frame 104 that may be displayed in full size on a display screen. The picture frame 104 may be represented as data that is encoded and segmented in various ways.

For the example shown, the picture frame 104 may have been transmitted in a quarter-size common image format (QCIF) indicating a pixel resolution of 176×144. In such a ease, the spatial multiplex video picture frame 100 is decoded as a 4CIF picture indicating a resolution of 704×576 because it contains sixteen QCIFs where four QCIFs form a CIF size image. It is to be understood that other picture size formats for the individual picture frames 104 and for the spatial multiplex video picture frame 100 are possible as well. For example, the multiplexed image may contain 64 individual QCIF picture frames and therefore have a 16CIF size.

The group of blocks format 110 is one alternative for segmenting and encoding the picture frame 104. The picture frame 104 of the group of blocks format 110 includes one or more rows of picture components known as groups of blocks 124. In the example, shown, the QCIF frame 104 has three rows of groups of blocks. A picture header 122 is also included. The picture header provides information to a decoder when the picture frame 104 is to be displayed in full size and tells the decoder that the picture frame 104 has a group of blocks format 110.

Each row 124 is made up of an array 112 of macroblocks 128 that define the luminance and chrominance of the picture frame 104. Bach row 124 also includes a header 126 that tells the decoder the position within the picture frame 104 where the row of group of blocks 124 belongs. In the example shown, the group of blocks 124 has two rows of macroblocks 128 because it is intended for the picture frame 104 to be displayed with 404 to 800 total lines. In reality, a group of blocks 124 will have many more macroblocks 128 per row than those shown in FIG. 1.

As discussed above, the group of blocks format defined by the H.263 standard requires that the row 124 always extends to the full width of the picture. Therefore, a direct remapping of a group of blocks format 110 to a spatial multiplex video picture frame 100 is not possible because the spatial multiplex video picture frame 100 requires individual frames to have a width that may be less than the full width of the picture. In the videoconferencing context, several participants may need to be displayed across the width of the picture as shown in FIG. 1, and a group of blocks format 110 does not permit such remapping.

An alternative format for segmenting and encoding the picture frame 104 is the slice format 106, such as defined by the H.263 standard. The slice format 106 is more flexible and does not require each slice to maintain the full width of the picture. The slice format 106 includes one or more picture components known as slices 116 that may or may not extend across the full width of the picture, and a picture header 114 that specifies to the decoder that the picture frame 104 has a slice format. Each slice 116 is made up of a grouping 108 of macroblocks 120. Each slice 116 also has a slice header 118 that indicates to the decoder the relative position of the slice in the picture 104.

The slice format 106 of the picture frame 104 allows the picture frame 104 to be multiplexed into the composite picture frame 100 with minimal decoding. The spatial multiplex video picture frame 100 may be created in a slice format 130 of many slices 134 corresponding to the slices 116 of the individual picture frames 102 forming the composite. As shown, the slices 134 have a width that is less than the picture width so that multiple slices 134 are provided for each row of slices of the picture. A new picture header 132 is also generated to indicate to the decoder that the picture frame 100 is of the slice format 130 and is of a 4CIF size, 16CIF size, and so on. The header, such as 118, of each slice 134 is modified to properly position the slice within the spatial multiplex video picture frame 100.

Figure 2:
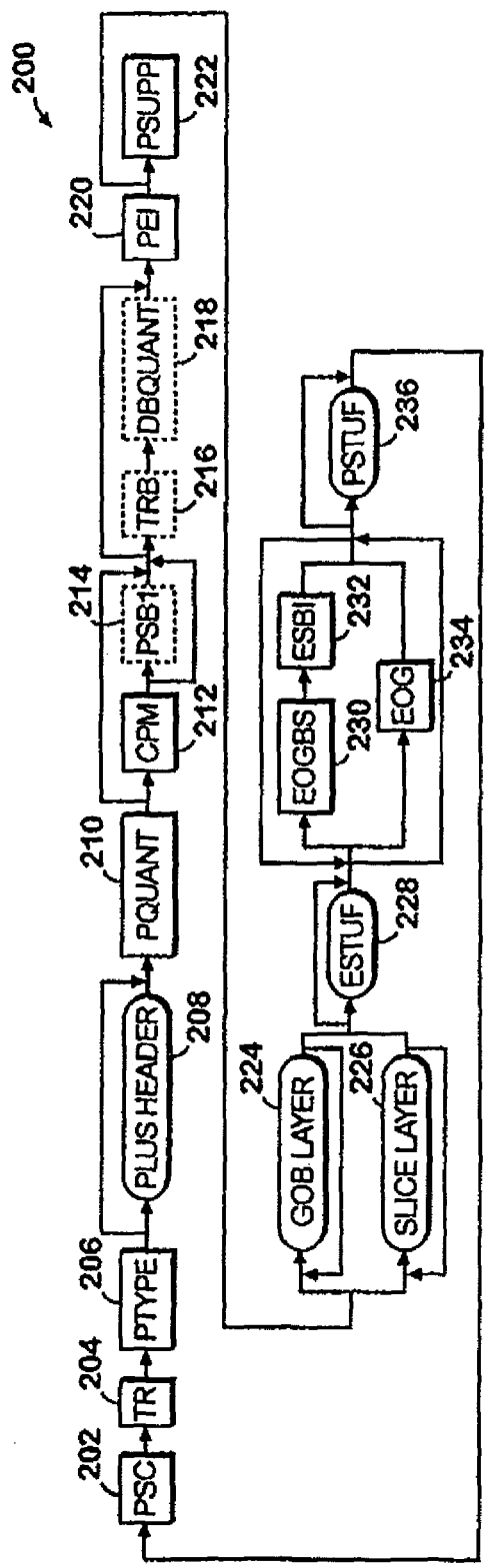
FIG. 2 is an exemplary picture layer syntax of a picture frame under the H.263 standard.

FIG. 2 shows the picture layer syntax 200 that is made up of the picture header included at the beginning of each picture frame as well as the group of block layer or slice layer. The picture layer syntax 200 includes a picture start code (PSC) 202 that signifies the beginning of a new picture frame. A temporal reference (TR) 204 follows in the bitstream and provides a value indicating the timing of display of the picture frame relative to a previous frame and the picture clock frequency. A PTYPE block 206 follows and provides information about the picture such as whether the source format of the picture frame is a quarter-size common image format (QCIF), a CIF format, or other.

Figure 5:
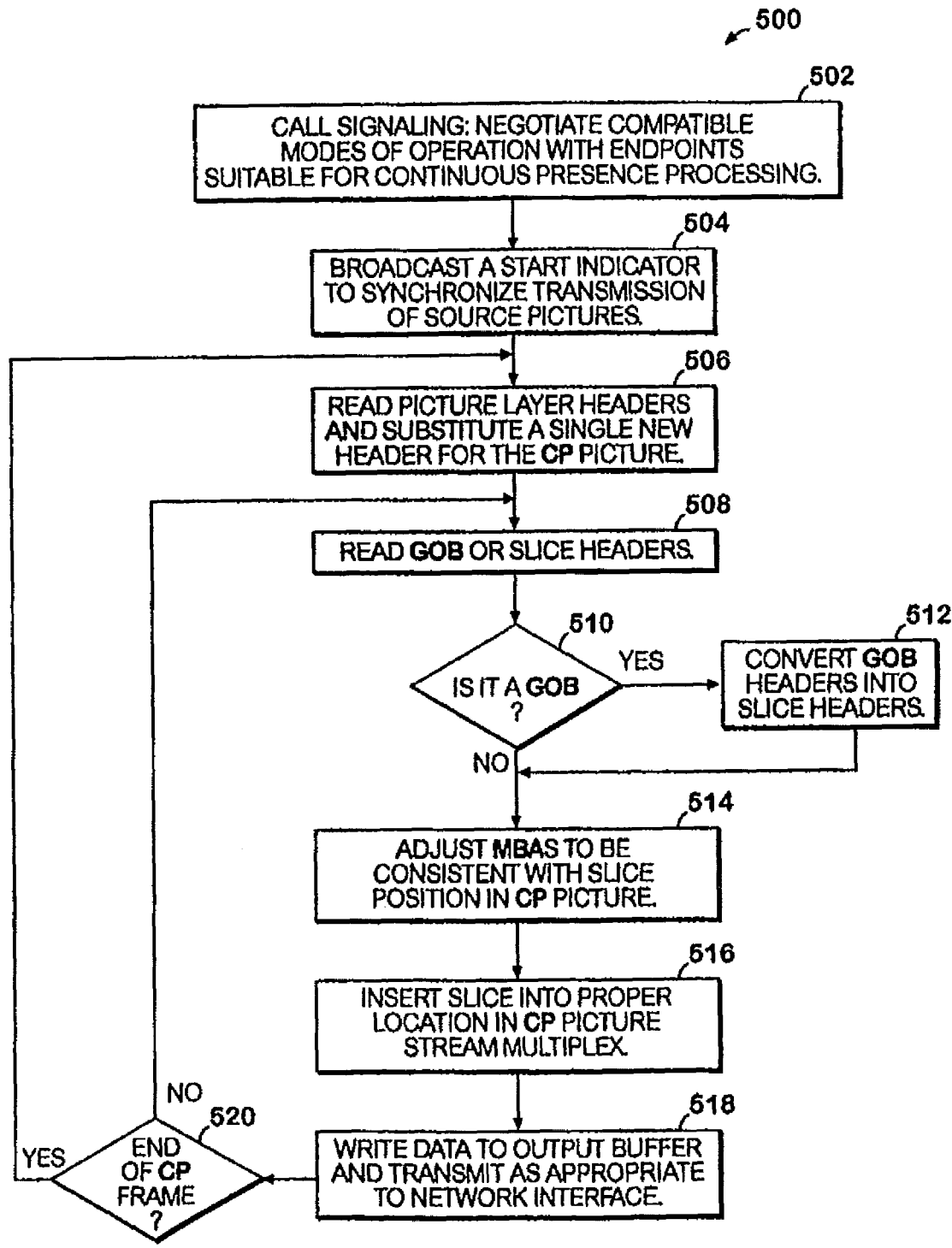
FIG. 5 is an operational flow for multiplexing picture frames utilized by one embodiment of the present invention.
Figure 6B:
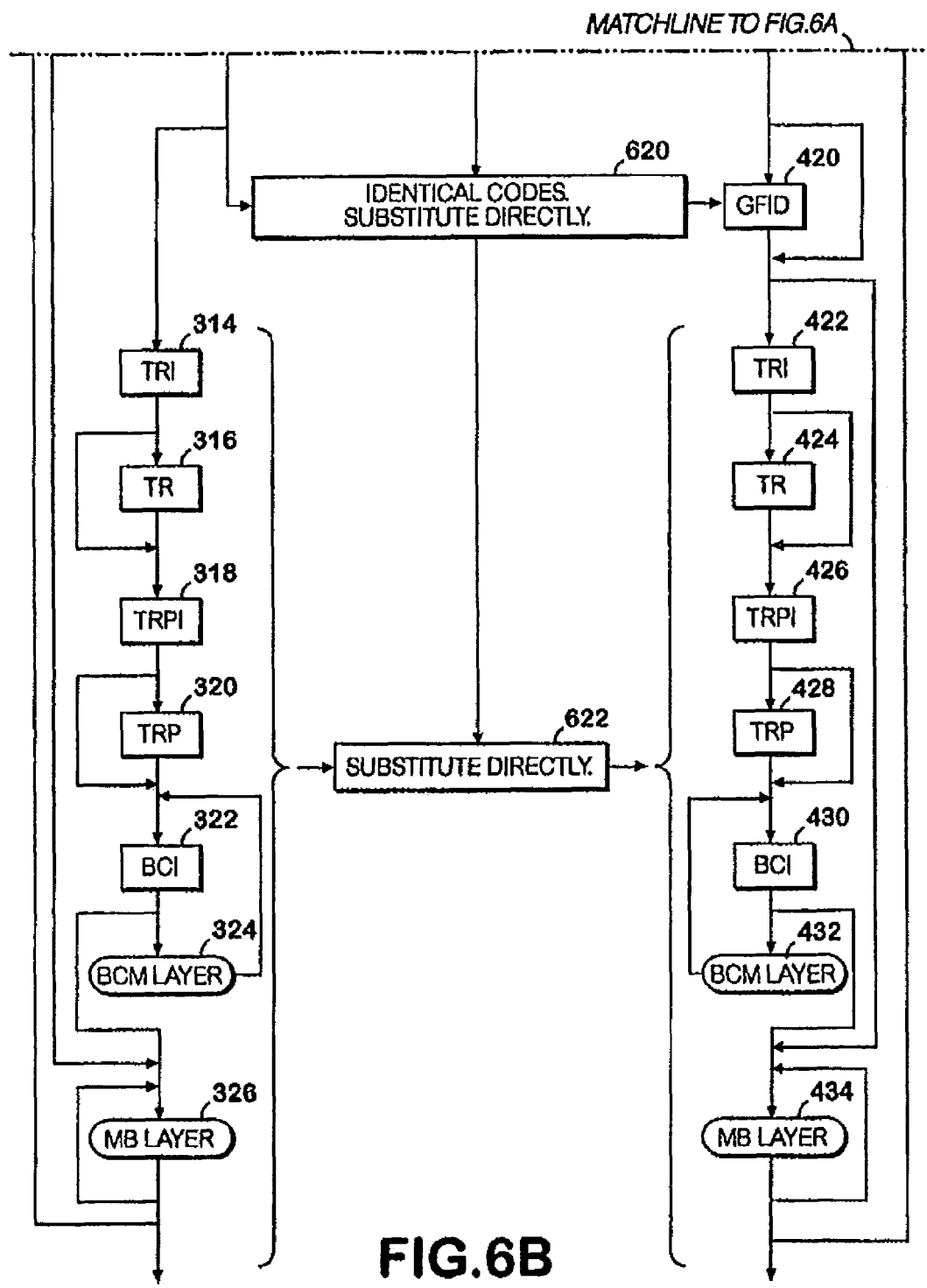
FIG. 6 is an operational flow of the group of blocks to slice format conversion utilized by the embodiment.

The picture layer syntax 200 may also include a PLUS HEADER block 208 that contains information about the picture frame, including whether the frame consists of groups of blocks. or slices. A PQUANT block 210 provides quantizer information to configure the quantization parameters used by the decoder. An optional continuous presence multipoint (CPM) block 212 signals the use of continuous presence multipoint and video multiplex mode discussed above that permits multiple individual frames to be included in the bitstream. As discussed the CPM mode causes the individual frames to maintain their identities as individual frames and requires that they be individually decoded and then processed to form a single image. A picture sub-bitstream indicator (PSBI) 214 may be included if CPM Mode is indicated. CPM mode may be implemented in conjunction with the logical operations of FIGS. 5 and 6 to provide sub-bitstreams that are themselves multiplexed bitstreams, or CPM may be turned off if only the logical operations of FIGS. 5 and 6 are desired for providing continuous presence video.

A temporal reference for B-picture parts (TRB) 216 may be included if a PB-frame is indicated by the PTYPE block 204 or PLUS HEADER block 208. A DBQUANT block 218 may also be included if a PB-frame is indicated to indicate the relation of the BQUANT quantization parameter used for B-picture parts in relation to the QUANT quantization parameter used for P-picture parts. A PEI block 220 includes a bit that signals the presence of the supplemental enhancement information (PSUPP) block 222. PSUPP block 222 defines extended capabilities for picture decoding. The group of blocks (GOB) layer 224 or slice layer 226 then follows in the bitstream. The GOB layer 224 contains each group of block of the picture frame and is discussed in more detail in FIG. 3. Slice layer 226 contains each slice of the picture frame and is discussed in more detail in FIG. 4.

The ESTUF block 228 is included to provide mandatory byte alignment in the bitstream. The end of sequence (EOB) block 234 may be included to signal the end of the sequence of group of blocks or slices. Alternatively, the end of sub-bitstream sequence (EOSBS) block 230 may be included to indicate an end of a sub-bitstream when in CPM. mode. An ending sub-bitstream indicator (ESBI) block 232 is included to provide the sub-bitstream number of the last sub-bitstream. The PSTUF block 236 is included to provide byte alignment for the PSC of the next picture frame.

Figure 3:
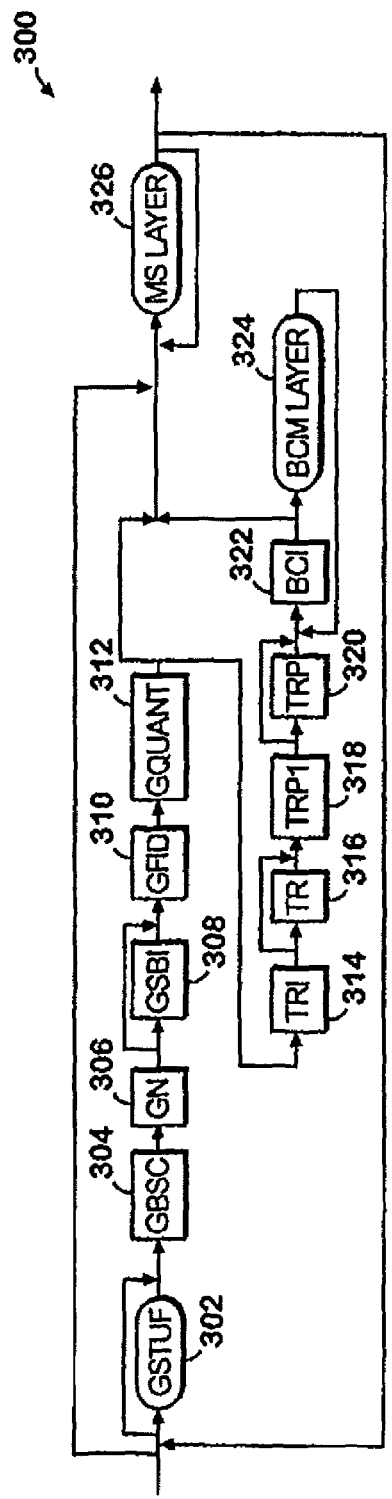
FIG. 3 is an exemplary group of blocks layer syntax under the H.263 standard.

FIG. 3 shows the group of blocks layer syntax 300 that is made up of the component header and the macroblocks of the array forming a group of blocks and that would be found in each group of blocks of the group of blocks layer 224 of FIG. 2. A GSTUF block 302 is included to provide byte alignment for a group of blocks start code (GBSC) 304. The GBSC 304 indicates to the decoder the start of a group of blocks. A group number (GN) block 306 indicates the group of block number that defines the position of the group of blocks in the picture frame. A GOB sub-bitstream indicator (GSBI) 308 may be included when in CPM mode to indicate the sub-bitstream number.

A GOB frame ID (GFID) 310 is included to indicate the particular frame that the group of blocks corresponds to. GQUANT block 312 provides quantizer information to control the quantization parameters of the decoder. A temporal reference indicator (TRI) block 314 is included to indicate the presence of a temporal reference when operating in a reference picture mode. A temporal reference (TR) block 316 is included to provide a value indicating the timing of display of the group of blocks relative to a previous group of blocks and the picture clock frequency. A temporal reference for prediction indication (TRPI) block 318 is included to indicate the presence of a temporal reference for prediction field (TRP) 320. The TRP field 320 indicates the temporal reference to be used for prediction of the encoding.

A back channel message indication (BCI) field 322 is included to indicate whether a message is to be delivered from the decoder back to the encoder regarding conditions of the received coded stream. A back channel message (BCM) layer 324 contains a message that is returned from a decoder to an encoder in order to tell whether forward-channel data was correctly decoded or not. A macroblock (MB) layer 326 contains a macroblock header and the macroblock data for the group of blocks.

Figure 4:
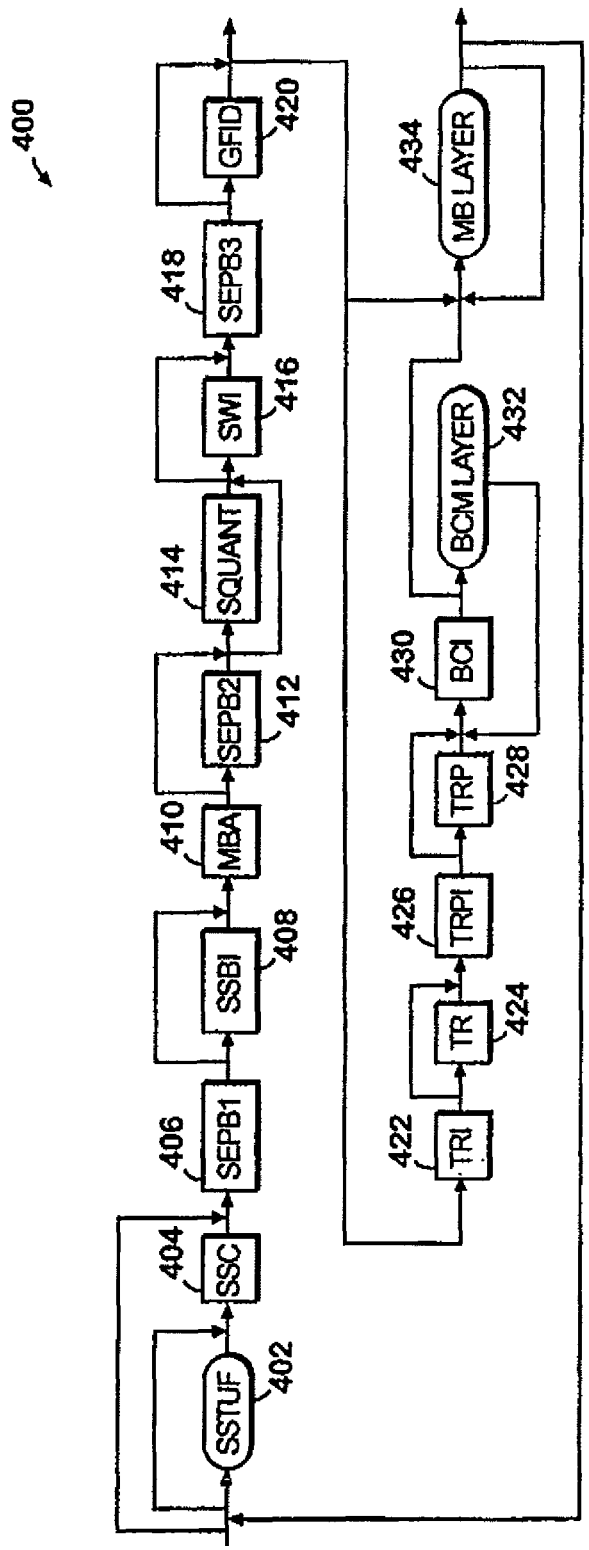
FIG. 4 is an exemplary slice layer syntax under the H.263 standard.

FIG. 4 shows the slice layer syntax 400 that is made up of the component header and the macroblocks of the array forming a slice and that would be found in each slice of the slice layer 226 of FIG. 2. An SSTUF block 402 is included to provide byte alignment for a slice start code (SSC) block 404 indicating the beginning of a slice. A first slice emulation prevention bit (SEPB1) 406 is included to prevent start code emulation after the SSC block 404. A slice sub-bitstream indicator (SSBI) block 408 is included when in CPM mode to indicate the sub-bitstream number of the slice. A macroblock address (MBA) field 410 is included to indicate the first macroblock of the slice as counted from the beginning of the picture in scanning order to set the position of each slice in the picture frame.

A second slice emulation prevention bit (SEPB2) block 412 is also included to prevent start code emulation after the MBA field 410. An SQUANT block 414 is included to provide quantizer information that controls the quantization parameters of the decoder. A slice width indication (SWI) block 416 is provided to indicate the width of the current rectangular slice whose first macroblock is specified by the MBA field 410. A third slice emulation prevention bit (SEPB3) 418 is included to prevent start code emulation after the SWI block 416. A slice frame ID (GFID) 420 is included to indicate the particular picture frame that the slice corresponds to. The TRI field 422, TR field 424, TRPI field 426, TRP field 428, BCI field 430, BCM layer 432, and MB layer 434 are identical to the fields of FIG. 3 that go by the same name.

The operational flow of the process 500 for multiplexing individual picture frames containing the GOB syntax 300 or the slice syntax 400 into a single picture frame is shown in FIG. 5. In this embodiment of the operational flow, it is assumed that the single picture frames are originating from encoder devices and are being processed by one or more decoder devices after transfer, such as through a network medium as shown in the systems of FIGS. 7 and 8. The process 500 begins at call operation 502 where the two devices passing the picture data establish a common mode of operation suitable for generating continuous presence video.

The common mode of operation includes a consistent usage of header information so that, for example, back channel messaging is employed between the encoder and decoder or other enhanced capabilities are realized. After communication is established, start operation 504 causes one device of the connection to broadcast a start indicator that allows synchronization of transmission of the individual picture frames from the various sources, such as the remote locations of the videoconference.

Once the picture frames to be included in the multiplexed frame have been received, header operation 506 reads the picture layer header, such as shown in FIG. 2, for each individual picture frame and discards them. This requires that only the picture header be decoded. A single new picture layer header that applies to the spatial multiplex video picture frame is created and encoded at header operation 506. The single new picture layer header provides in the PTYPE field 206 an indication that the spatial multiplex video picture frame is of a size capable of including the number of individual frames being multiplexed. The PLUS HEADER field 208 of the new picture header is configured to indicate a rectangular slice format.

After substituting the new picture header, the component header of one of the individual frames is interpreted at read operation 508 in preparation for subsequent processing discussed below including conversion to a slice format and repositioning within the multiplexed image. Query operation 510 detects whether the picture header read in header operation 506 for the current picture frame indicates a group of blocks format. If a group of blocks format is detected, then conversion operation 512 converts the group of blocks headers into slice headers. Conversion operation 512 is discussed in greater detail below with reference to FIG. 6. If a group of blocks format is not detected, then the conversion operation 512 is skipped since a slice format is already present in the picture frame.

After finding or converting to a slice format, macroblock operation 514 alters the MBA 410 within each slice of each picture frame to position the slice within a particular region of the spatial multiplex video picture frame. For example, one individual picture frame must go in the top left-hand corner of the multiplexed picture so the top-leftmost slice of that picture frame is given an MBA 410 corresponding to the top left-hand corner position. The component header is also re-encoded at this operation after the MBA 410 has been altered. The slice is then inserted into the proper location in the continuous presence picture stream by concatenating the bits of the slice with the bits already present in the picture stream including the new picture header at stream operation 516. The picture stream may be delivered as it is being generated at transmit operation 518 wherein the current slice is written to an output buffer and then transmitted to a network interface.

After writing the slice to the output buffer, query operation 520 detects whether the last slice was the end of the continuous presence or spatial multiplex video picture frame. If it was not the last slice of the multiplexed frame, then flow returns to read operation 508 where the header of the next group of blocks or slice to be included in the spatial multiplex video picture frame is read. If query operation 520 determines that the last slice was the end of the spatial multiplex video picture frame, then flow returns to header operation 506 wherein the picture headers for the next set of individual picture frames are read and discarded.

FIG. 6 shows the operational flow of the conversion operation 512. Conversion operation 512 begins at alignment operation 602 where the GSTUF field of the GOB syntax 300 is converted to an SSTUF field of the slice syntax 400 by adjusting the length of the stuff code to provide byte alignment of the next code element. At start code operation 604, the GBSC 304 is maintained because it is already identical to the SSC 404 needed in the slice syntax 490. At prevention operation 606, the SEPB1 406 is inserted into the bitstream to later prevent start code emulation when being decoded.

Translation operation 608 converts the GSBI 308 to the SSBI 408. During this operation, GSBI '00' becomes SSBI '1001', GSBI '01' becomes SSBI '1010', GSBI '10' becomes SSBI '1011', and GSBI '11' becomes SSBI '1101'. At MBA operation 610, the GN 306 is replaced by an MBA 410 chosen to place the slice in its designated location within the composite picture frame resulting from multiplexing the individual picture frame bitstreams. Prevention operation 612 then places a SEPB2 into the bitstream to prevent start code emulation. At quantizer operation 614, GQUANT is maintained in the bitstream after SEPB2 because GQUANT is already identical to SQUANT 414.

Slice operation 616 then sets the width of the slice, or SWI 416, to the width of the GOB in terms of the number of macroblocks. This is possible because the slice structure selection (SSS) field (not shown) of the PLUS HEADER field 208 of the picture syntax 200 of FIG. 2 has been set to the rectangular slice mode in header operation 506 of FIG. 5. Prevention operation 618 then inserts a SEPB3 into the bitstream to prevent start code emulation when the slice is decoded. At GFID operation 620, the GFID 310 is maintained in the bitstream after SEPB3 because it is already identical to GFID 420. In substitute operation 622, all remaining portions of the GOB syntax 300 are maintained in the bitstream because they are also identical to the remaining portions of the slice syntax 400.

FIG. 7. shows one network environment for hosting a continuous presence videoconference. A server 702 communicates through bi-directional communication channels 716 with client devices 704, 706, 708, and 710. Each client device, such as a personal computer or special-purpose videoconferencing module, is linked to a camera 712 or other video source and a video display 714. The client devices transmit sequences of encoded picture frames produced by the camera 712 or other video source to the server 702 though the communication channels 716. The server 702 then employs the processes of FIGS. 5 and 6 to combine all of the encoded picture frames into an encoded spatial multiplex video picture frame. The server 702 then transmits the spatial multiplex video picture frame back through the communications channels 716 to the client devices where it is decoded and displayed on each display screen 714. Thus, the client devices may include encoder and decoder processing but do not need to include the multiplexing processing discussed above.

Four client devices are shown only for exemplary purposes, and it is to be understood that any number of client devices may be used subject to the limitation on the total number of individual frames to be included on the display 714. It is also to be understood that each individual frame to be included in the multiplexed frame through the processes of FIGS. 5 and 6 does not have to be of the same size, such that one frame may occupy more screen area than others. For example, the frame showing the person currently speaking in a videoconference may be enlarged relative to frames showing other participants. One skilled in the art will recognize that negotiation between participating devices can be established such that mode switching can occur to permit one or more participants to provide one image size (e.g., QCIF) while other participants provide a different image size (e.g., CIF), subject to the ability to combine the image sizes into a composite that will fit on the intended display. Furthermore, it is to be understood that the server 702 may customize each videostream being returned to each client device 704, 706, 708, and 710, such as by removing the frame provided by the recipient client device from the spatial multiplex being returned or creating the spatial multiplex from some other subset.

The communication channel between the client devices 704, 706, 708, and 710 and the server 702 can be of various forms known in the art such as conventional dial-up connections, asymmetric digital subscriber lines (ADSL), cable modem lines, Ethernet, and/or any combination. An Internet Service Provider (ISP) (not shown) may be provided between the server 702 and each client device, or the server 702 may itself act as an ISP. The transmissions through a given channel 716 are asymmetric due to one picture frame being transmitted to the server 702 from each client device while the server 702 transmits a concatenation of picture frames forming the multiplexed bitstream back to each client device. Therefore, ADSL is well suited to picture frame transfer in this network configuration since ADSL typically provides a much greater bandwidth from the network to the client device.

FIG. 8 shows an alternative network configuration where each client device 802, 804, 806, and 808 has its own processing device performing the operations of FIGS. 5 and 6. Each client device is linked to a camera 810 or other video source and a display 812. A bi-directional communication path 814 interconnects each client device to the others. The bi-directional communication paths 814 can also be of various forms known in the art such as conventional dial-up connections, asymmetric digital subscriber lines (ADSL), cable modem lines, Ethernet, and/or any combination. One or more ISPs (not shown) may facilitate transfer between a pair of client devices.

Each client device generates an encoded picture frame sequence that is transmitted to the other client devices. Thus, each client device receives an encoded picture frame from the other client devices. The client device may then perform the multiplexing operations discussed above to create the spatial multiplex video picture frame that is displayed.

Multiplexing the individual picture frames together at each client device where the spatial multiplex video picture frame will be displayed allows each client device to have control over the spatial multiplex video picture frame it will display. For example, the client device can choose to exclude certain picture frames or alter the displayed size of particular picture frames. In a videoconference, the client device may choose to eliminate the picture frame that it generates and sends to others from the spatial multiplex video picture frame that it generates and displays. Because each client device performs the multiplexing operations, the communication paths 814 carry only the individual picture frame sequences generated by each sending client device rather than spatial multiplex video picture frame sequences.

Figure 9:
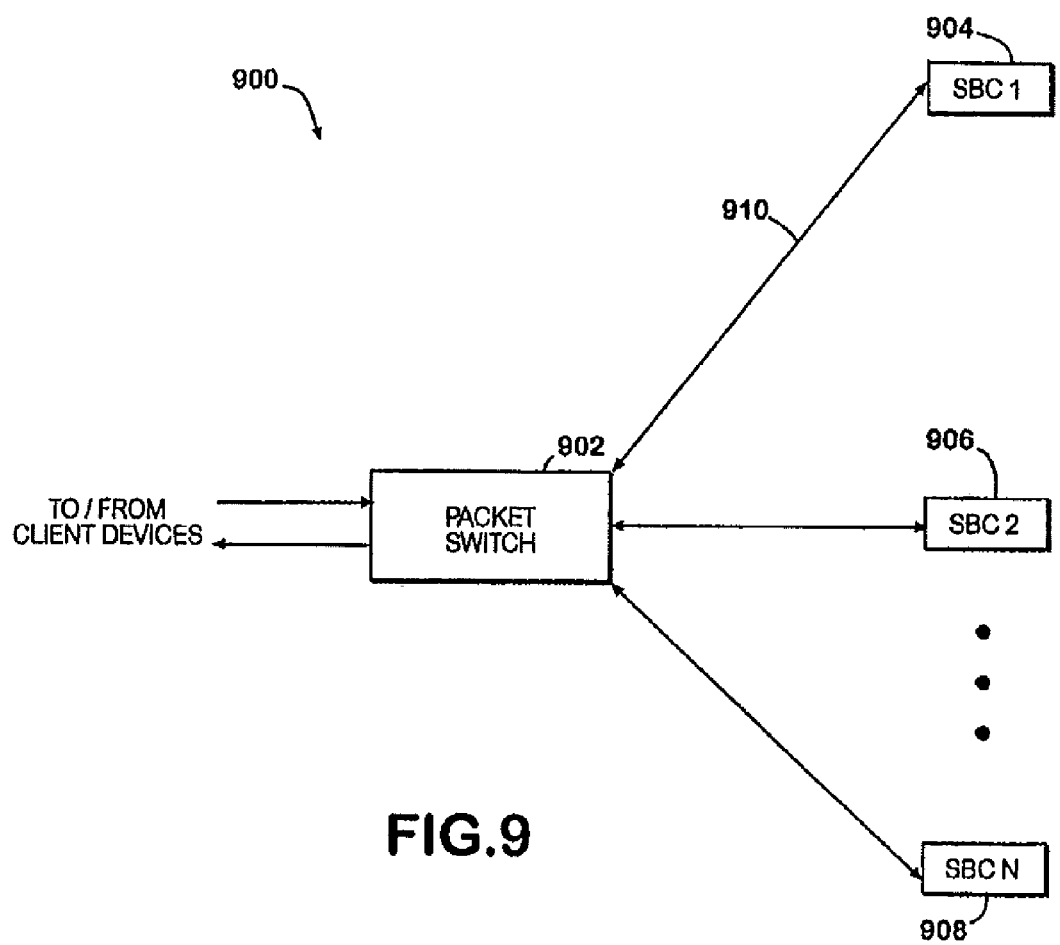
FIG. 9 is a block diagram of an embodiment of a sealable multiplexing facility.

FIG. 9 shows an example of a scalable multi-point conferencing facility 900. The facility includes a packet switch 902; such as a multi-gigabit Ethernet switch, linked to several processing modules, such as single board computers (SBCs) 904, 906, and 908. An SBC generally refers to a computer having a single circuit board including memory, magnetic storage, and a processor for executing a logical process such as those of FIGS. 5 and 6. The processing modules may include general-purpose programmable processors or dedicated logic circuits depending upon the performance necessary. Because the operations of FIGS. 5 and 6 to be performed by the processing modules requires only decoding of header information, programmable processors are adequate for continuous presence processing in real time for most implementations.

The processing modules are linked to the packet switch 902 through high-speed serial interfaces 910, such as Fast/Gigabit Ethernet. The packet switch 902 receives encoded picture frame sequences from client devices, such as discussed with reference to FIG. 7, but possibly from several videoconferencing sessions. The packet switch 902 may then send all picture frame sequences corresponding to a particular videoconference to one of the processing modules 904, 906, or 908. The processing module multiplexes the picture frames to generate a spatial multiplex video picture frame and sends the spatial multiplex video picture frame sequence back to the packet switch 902. The packet switch 902 then delivers the spatial multiplex video picture frame sequence back to client devices of the particular videoconference.

Thus, the scalable multi-point conferencing facility 900 can provide multiplexing services for multiple videoconference groups simultaneously. As the number of videoconference groups at any given time increases or decreases, the processing modules employed by the packet switch 902 can be added or removed from active service and made available for other duties when not needed by packet switch 901

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A device for creating a combined video image from a plurality of video images, comprising:
    a processor; and
    a memory having stored thereon instructions which, when executed by the processor, cause the processor to perform operations comprising:
        removing an image header from each video image to be included in the combined video image, wherein each video image has a plurality of video image components, and each video image component has an image component header;
        generating a new image header for the combined video image, the new image header indicating a combined format;
        altering the image component header of each video image component to be included in the combined video image to set an image position for the video image component within the combined video image; and
        generating the combined video image by concatenating the new image header together with the plurality of video images having no image headers and the video image components having the altered image component headers.

2. The device of claim 1, wherein the plurality of video images are received via a data packet switch, and the combined video image is transmitted via the data packet switch.

3. The device of claim 2, wherein the data packet switch includes an Ethernet switch.

4. The device of claim 1, wherein the processor includes a dedicated processor.

5. The device of claim 1, wherein the plurality of video images are received from a plurality of video devices via a plurality of communication channels.

6. The device of claim 1, wherein the combined video image is transmitted to a plurality of video devices via a plurality of communication channels.

7. The device of claim 1, wherein the plurality of video images are received via an asymmetric digital subscriber line.

8. The device of claim 1, wherein the combined video image is transmitted via an asymmetric subscriber line.

9. The device of claim 1, wherein the instructions, when executed by the processor, further cause the processor to decode the image component headers of the plurality of video image components and re-encode the image component headers.

10. The device of claim 1, wherein the instructions, when executed by the processor, further cause the processor to present for display the combined video image.

11. The device of claim 1, wherein the combined format based image position for each video image is a unique image position, and the combined video image represents a mosaic of video images.

12. The device of claim 1, wherein each video image includes a video picture frame, the combined video image includes a composite picture frame, each video image component includes a slice of the video picture frame, each image component header of each video image component includes a slice header comprising a macroblock address field, and altering the image component header to set an image position for the video image component within the combined video image includes altering the macroblock address field of each slice header to position the slice of the video picture frame within a particular region of the composite picture frame.

13. The device of claim 1, wherein the plurality of video images are received from a plurality of video devices.

* * * * *